UNITED STATES PATENT OFFICE.

HEINRICH BAUM, OF HÖCHST-ON-THE-MAIN, GERMANY, ASSIGNOR, BY MESNE ASSIGNMENTS, TO FARBWERKE, VORMALS MEISTER, LUCIUS & BRÜNING, OF SAME PLACE.

COLORING-MATTER OR DYE-STUFF.

SPECIFICATION forming part of Reissued Letters Patent No. 9,986, dated December 27, 1881.

Original No. 210,233, dated November 26, 1878. Application for reissue filed November 4, 1881.

DIVISION A.

*To all whom it may concern:*

Be it known that I, HEINRICH BAUM, a subject of the Emperor of Germany, residing at Höchst-on-the-Main, Germany, have invented certain new and useful Improvements in Dye-Stuffs or Coloring-Matters, of which the following is a specification.

This invention consists in a red scarlet coloring-matter produced by the action of bisulphobetanaphtholic sodium salt insoluble in alcohol on the diazoic derivative of xylidine.

In carrying out my invention I first produce bisulphobetanaphtholic acids by mixing one part of betanaphthol with three parts of sulphuric acid of 1.848 specific gravity, and heating the mixture for twelve hours at a temperature of 212° to 230° Fahrenheit. Two isomeric bisulphobetanaphtholic acids are thereby obtained, the soda salts of which are easily separated from each other by being digested with three or four parts of alcohol, the salt that is insoluble in alcohol being filtered and dried, while the soluble salt is extracted by evaporation and dried.

To obtain my new red scarlet coloring-matter, I take six and one-half parts, by weight, of xylidine, dissolve the same in twelve parts of muriatic acid (specific gravity 1.16 to 1.18) and one hundred parts of water, to which are added four and one-half parts of pure nitrite of potash. I then take twenty parts, by weight, of the above-described soda salt of bisulphobetanaphtholic acid insoluble in alcohol, dissolve the same in two hundred parts of water and ten parts of ammonia, of ten per cent., and mix this solution with the above-described solution of xylidine, when the coloring-matter is precipitated in the form of paste. The latter is dissolved in water, the coloring-matter precipitated with salt, and then dried. A powder is thereby obtained which has a fiery-red color, and which dyes wool with a deep-red scarlet.

My coloring-matter is freely soluble in water, and by adding permanganate of potash to its aqueous solution the coloring-matter is precipitated. It dissolves in concentrated sulphuric acid with a yellowish-red color. It is difficultly soluble in alcohol with a fiery-red color. By heating the coloring-matter with tin and muriatic acid a yellowish-white precipitate of beta-amidonaphthol disulpho-acid is obtained, and the solution contains hydrochlorate of xylidine.

What I claim as new, and desire to secure by Letters Patent, is—

1. As a new article of manufacture, the red scarlet coloring-matter having the characteristics above described.

2. The within-described process for producing a dye-stuff or coloring-matter by the action of the sodium salt of bisulphobetanaphtholic acid insoluble in alcohol, on the diazoic derivative of xylidine, substantially in the manner set forth.

In testimony whereof I have hereunto set my hand this 5th day of September, 1881.

HEINRICH BAUM.

Witnesses:
JOSEPH EUGEN REVERDY,
ALBERT FRÖSCHMANN.